United States Patent [19]

Opower

[11] Patent Number: 4,688,229
[45] Date of Patent: Aug. 18, 1987

[54] GAS LASER STRUCTURE, PARTICULARLY $CO_2$ LASER

[75] Inventor: Hans Opower, Krailling, Fed. Rep. of Germany

[73] Assignee: W.C. Heraeus GmbH, Hanau, Fed. Rep. of Germany

[21] Appl. No.: 760,166

[22] Filed: Jul. 29, 1985

[30] Foreign Application Priority Data

Sep. 19, 1984 [DE] Fed. Rep. of Germany ....... 3434373

[51] Int. Cl.⁴ ............................................. H01S 3/097
[52] U.S. Cl. ...................................... 372/87; 372/85; 372/58; 372/55
[58] Field of Search ....................... 372/87, 85, 58, 35, 372/61, 55

[56] References Cited

U.S. PATENT DOCUMENTS 4,510,608  4/1985  Fujii et al. ............................. 372/87
4,606,035  8/1986  Hishii et al. ........................... 372/85

FOREIGN PATENT DOCUMENTS 3005072  8/1980  Fed. Rep. of Germany .
3434373  4/1986  Fed. Rep. of Germany .

Primary Examiner—James W. Davie
Assistant Examiner—Georgia Y. Epps
Attorney, Agent, or Firm—Frishauf, Holtz, Goodman, Woodward

[57] ABSTRACT

To improve the power transfer of a glow discharge between a cathode (3) and an anode (4) in a glow discharge space (2), through which a laser-active is being passed (5) at high speed, the cathode is constructed to have a rotating surface, projecting through slits (8) of the walls (1) defining the discharge space into the discharge space, the tangential or surface speed of the cathode (3) being at least approximately equal to the flow speed of the gas, so that the gas will flow along the cathode in essentially laminar, linear flow, thereby avoiding turbulence at the surface and instabilities in the glow discharge.

20 Claims, 4 Drawing Figures

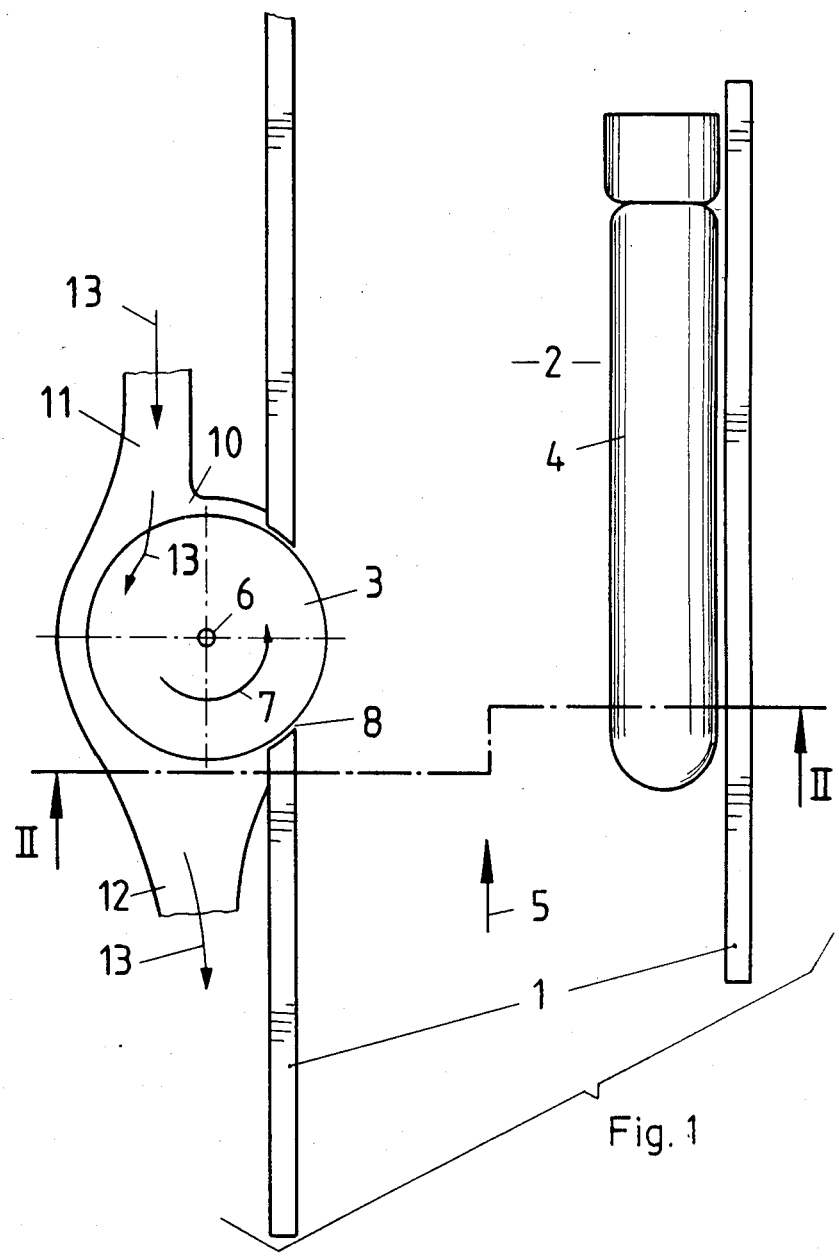
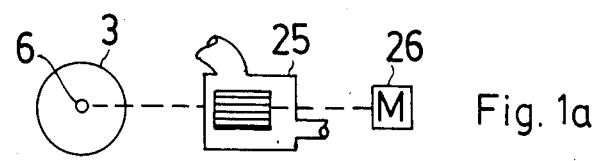
Fig. 1
Fig. 1a

GAS LASER STRUCTURE, PARTICULARLY CO₂ LASER

The present invention relates to a gas laser, and particularly to a $CO_2$ laser, having a discharge space through which laser-active gas is passed with high speed. A direct current discharge is provided for stimulation of the gas discharge. The direct current field is generated by an anode and an oppositely located cathode, both of which extend in the direction of gas flow, and glows or discharges thereacross.

BACKGROUND

Gas lasers of the type described are generally known. When high-power lasers are to be constructed, particularly $CO_2$ high-power lasers, the arrangement is usually so made that the laser-active gas is driven transversely over a short path through the excitation space in which a gaseous discharge occurs, glowing between two electrodes. The electrical field of the gaseous discharge and the flow direction of the gases are at right angles with respect to each other. The optical axis of the laser resonator extends at a right angle to the electrical field and to the gas flow.

The arrangement has the advantage that the active gas has only a very short dwell time in the region of the gaseous discharge, and thus can accept high electrical power without excessive temperature occurring; the temperature, thus, will not exceed acceptable values. The direct voltage required to maintain the discharge requires an electrical uniform field having a supply voltage in the order of about 2000 V.

In various practical construction, it has been found that the energy transfer which is theoretically possible, and particularly when the gaseous densities are high, cannot be reached. The reason appears to be instabilities which occur, which lead to the formation of negative ions and then to loss of electrons, and the occurrence of arcing. To suppress such undesirable instabilities, it has been proposed to use a pure laser gas free from contaminants. Additionally, the electrical system was modified in order to increase the generation of electrons. Specifically, some special electrical circuits for use with the cathode have been used, as well as additional discharges based on spark or corona discharges. Such auxiliary discharges, however, have the disadvantage that they require high-voltage circuits in the kilowatt-power range and, additionally, require components which are subject to excessive wear in operation.

THE INVENTION

It is an object to provide a gas laser, particularly a $CO_2$ laser, which has a substantially higher efficiency than heretofore possible.

Briefly, the cathode is formed with a rotating surface which, in a portion thereof facing the anode electrode, has a component of motion coincident with the direction of flow of the gas to be stimulated.

The rotating electrode, with the direction of rotation being such that the surface motion vectorial component of the cathode is along the flow, decreases instabilities, and, in most cases, completely suppresses instabilities.

Investigations, in accordance with the invention, have found that the instabilities usually arise in the region adjacent the cathode of the discharge, as a consequence of the detachment of the laminar flow from the cathode surface. By so constructing the cathode that it has a surface which is movable in the direction of flow of the laser-active gas, the discharge space is passed by the laser-active gas in turbulent-free manner, that is, essentially in laminar flow manner. In accordance with a feature of the invention, thus, the cathode is so constructed that the detachment of laminar flow from the cathode is effectively eliminated, and, rather, non-turbulent flow promoted. In other words, the structure is such that non-turbulent flow occurs in the cathode region.

In accordance with a feature of the invention, the surface speed of the cathode should be at least approximately the same as the flow speed of the gas in the cathode region, so that, effectively, the relative speed between the flowing gas and the cathode body will be zero or null. Complete conservation of laminar flow along the cathode is also obtained if the surface speed of the cathode, for example the tangential speed of a cylindrical cathode, is higher, preferably slightly higher than the speed of the gas flowing in the region adjacent the cathode.

DRAWINGS

FIG. 1 is a general schematic representation of a laser arrangement in the region of the electrodes, omitting all elements not necessary for an understanding of the invention, in side view;

DETAILED DESCRIPTION

Figure 2:
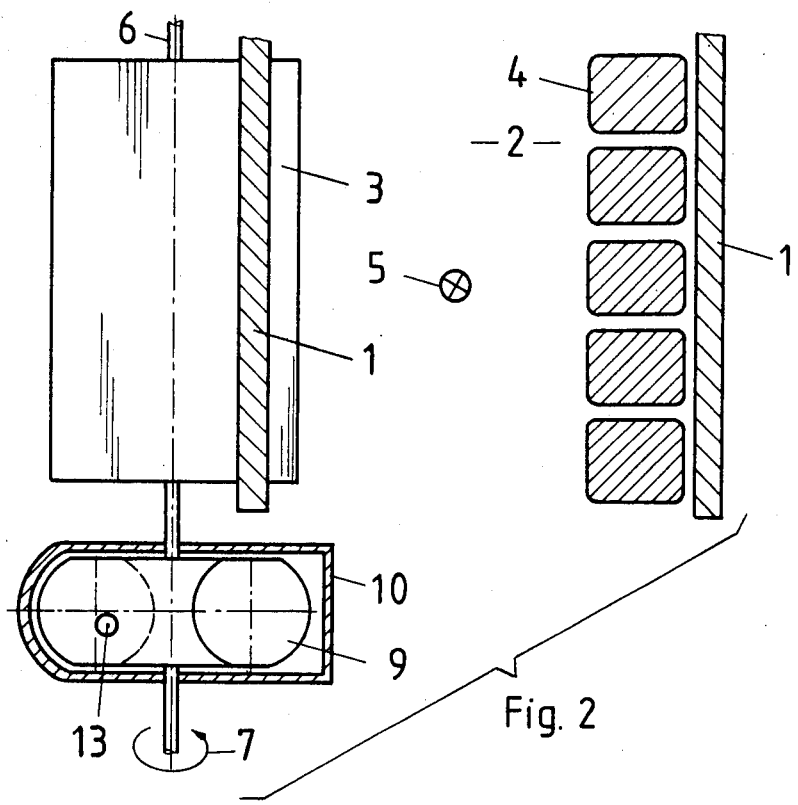
FIG. 2 is a cross-sectional view along line II—II in FIG. 1.

The laser shown inFIG. 1 has two side walls 1 which define a gas discharge space. The gas discharge glows between an anode 4 and a cathode 3. The anode 4 extends in the flow direction of the gas, schematically indicated by arrow 5, through the discharge space, for a distance of about 10 cm. The electrical field of the gas discharge 5. the optical axis of the laser resonator—now shown—is located at a right angle to the electrical field and to the gas flow, in other words, in and out of the plane of the drawing sheet.

In accordance with a feature of the invention, the cathode 3 is rotatable and forms a rotation-symmetrical body, that is, a body which is symmetrical about its axis of rotation. Cathode 3 rotates about an axis of rotation 6 in the direction of the arrow 7 such that it extends slightly within the discharge space 2 through a slit 8 formed in the side wall 1 adjacent the cathode. The surface of the cathode which extends into the discharge space 2, that is, extends beyond the left (with respect to FIG. 1) wall 1, moves in the direction of the flow of the gas 5. Preferably, the cathode 3 is cylindrical—see FIG. 2—and is rotated with such a speed that the tangential speed at its surface is at least approximately the same as the speed of the gas flow in the direction of the arrow 5, preferably identical thereto. The differential speed between the tangential speed of the cathode and the speed of the gas flow should be at least approximately zero or null. Making the gas flow speed and the cathode speed equal, or at least approximately equal, the flow layer at the cathode will not separate therefrom.

As best seen in FIG. 2, the axis of rotation 6 is secured to a turbine wheel 9, for example formed by two flaps or vanes, located within a housing 10, and rotatably retained in the housing. The turbine wheel 9 drives the cathode 3. A flow medium is introduced into the housing 10 through an inlet 11, along arrow 13, and leaves the housing through an outlet 12—see FIG. 1—which shows the fluid flow. A suitable fluid medium can be the laser gas itself before it is introduced into the excitation space 2; alternatively, another gas can be used, for example a cooling ags. The cathode 3 can be driven differently as well, for example can be coupled directly to an arrangement to pump the laser gas or a cooling medium; for example, it can be coupled to a compressed gas or blower arrangement, so that a separate drive for the cathode 6 is not required.

Figure 3:
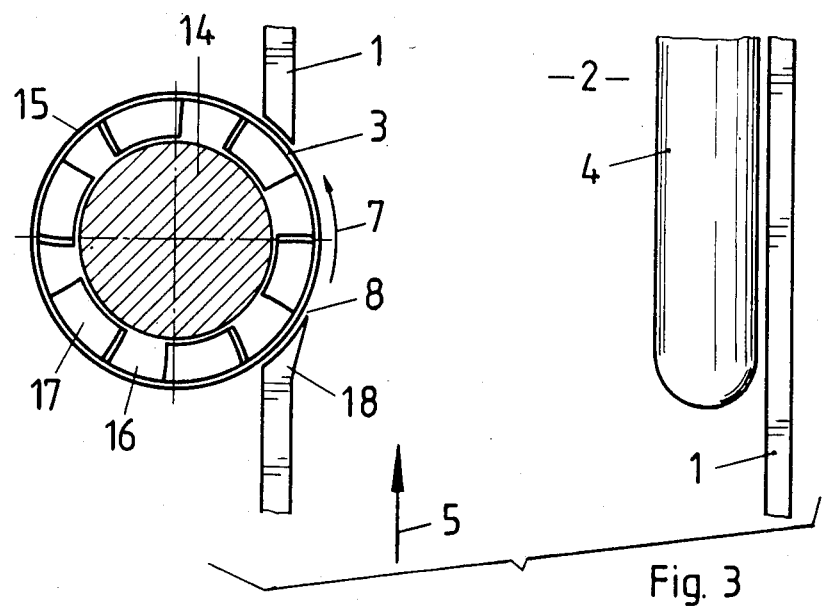
FIG. 3 shows a modified cathode drive arrangement.

The arrangement of FIG. 3 is modified with respect to that of FIGS. 1 and 2 in that the cathode is a two-element construction having an outer cylinder 15 within which an inner cylinder 14 is located. The diameter of the cylinder 14 and the interior diameter of the rather thin-walled cylinder jacket 15 are so selected that a gap 16 remains between the two cylinders. The inner surface of the cylinder jacket 15 is formed with flow directing vanes or flow surfaces 17, which are seen in the two view of FIG. 3. They extend, spirally, into the interior of the cylinder jacket 15, at an inclination in counter-clockwise direction. The inner cylinder 14 is fixed. The outer cylinder or jacket 15 is suitably rotatably held in position in any well-known manner, not illustrated since any bearing structure of well known arrangement may be used. The outer cylinder 15 is driven in the direction of the arrow 7 by introducing a fluid flow, preferably a gas flow, into the gap 16. A suitable medium is a cooling medium, that is, a cooling gas. In the illustration of FIG. 3, the cooling gas would be introduced from above into the plane of the drawing of FIG. 3. This arrangement has the advantage that only the outer cylinder jacket 15 has to be moved, so that the mass of the structure which is subject to rotation is a minimum; at the same time, the cooling medium which flows through the interior of the cathode cools the cathode.

Of course, the outer cylindrical jacket 15 may be driven separately by a different drive, for example, by a drive arrangement already present in the laser system, such as a blower structure compressor, or similar apparatus.

FIG. 3 also shows a further feature which may be equally used in the structure of FIG. 1. The wall 1 adjacent the cathode is formed with a flow directing portion 18 which, for example, is fitted on the left wall portion adjacent the slit 8, and which extends towards the surface of the cylindrical cathode, in FIG. 3 the cylindrical cathode jacket 15. This improves the flow adjacent the surface of the cylindrical cathode.

Use of an arrangement which already causes gas flow, and already present in the laser structure, in order to drive the rotatable cathode, is a particularly preferred arrangement. A special separate drive for the cathode or its surface (FIG. 3) thereof then can be elimated, particularly if the drive is a gas or pneumatic drive, using the gas which is to be conducted into the laser excitation space, for example the laser gas or a buffering gas. In accordance with a preferred embodiment, the gas is first passed through the turbine arrangement 9, 10 (FIGS. 1, 2) or through the ring gap 16 (FIG. 3), and then conducted into the laser excitation space or chamber 2.

The arrangement of FIG. 3 has the additional advantage that the gas passing through the gap 16 of the cathode cools the cathode. The structure is particularly simple to carry out when the cathode itself is an outer thin-walled cylinder, the outer carries the vanes 17, surrounding the fixed cylinder 14. The diameters of the cylinder jacket 15 and the fixed clyinder 14 are so selected that the gap is just large enough to accept the vanes 17, with some clearance for rotation of the vanes about the central body 14. The fluid, typically the gas which will be introduced into the space 2, is then axially introduced into the gap, thereby rotating the cylinder 15, as well known. Of course, this gap can be used to pass a cooling medium therethrough different from the gas to be introduced into the space 2; even if the gas is then to be used in the space 2, cooling of the cathode is effected. This arrangement has the additional advantage that the low mass of the rotating cathode permits easy journallin thereof, and only little mass need be moved.

In accordance with a preferred feature of the invention, the rotatable cathode is so integrated in the wall which defines the discharge space 2 that it extends only slightly into the discharge space. By this arrangement, the cathode will provide only slight flow resistance to the gas flowing in the excitation space. In accordance with one example, which has been found advantageous, the diameter of the cathode was between about 3 to 6 cm, preferablyabout 5 cm. A cathode of these dimensions, integrated into the wall of the laser excitation space may extend into the laser excitation space by a distance of about 10% of its diameter, that is, in a 5 cm electrode, ½ cm, so that the otherwise smooth straight construction of the wall 1 is interrupted only by a slight bulge extending therein. Use of a flow directing element 18 (FIG. 3) and extending in the region of the cathode and ahead of the leading edge thereof which extends into the excitation space further improves linear, laminar flow along the cathode, and prevents turbulence at the surface thereof. The flow directing element 18 directs gas flow to the surface of the cathode and may extend into the discharge space 2 by about half to two-thirds of the overall projection of the cathode therein.

Various changes and modifications may be made, and features described in any one of the embodiments may be used with any of the others, within the scope of the inventive concept.

For example, a drive arrangement for the cathode 3 which does not rely on the direct flow of the gas in the discharge space is shown in FIG. 1a, in which the shaft 6 of the cathode 3 is coupled to a blower 25 which is driven by a motor 26. The coupling is schematically shown by the broken lines, which may be a shaft connection, a belt drive or any other suitable drive arrangement. The gas inlets and outlets of the blower 25 are only schematically indicated and coupled to suitable gas supply and to the discharge space 2, for example, or to provide cooling for a cathode similar to the cathode of FIG. 3.

I claim:

1. Gas laser structure, particularly $CO_2$ laser, having means (1) for defining a discharge space (2) through which a laser-active gas is being passed at high speed in a predetermined flow direction, a cathode electrode (3) and an anode electrode (4) located in the discharge space and spaced from each other, for stimulating said laser-activated gas flowing in said direction in said discharge space by uniirectional discharge between said electrodes, across the direction of flow of the gas, wherein the cathode electrode (3) comprises a rotation-symmetrical body rotating about an axis positioned with respect to the circumferential surface of said rotation-symmetrical body such that the geometric form of the surface facing the anode electrode (4) does not change;

and means (25, 26) for rotating said cthode electrode at a speed such that the surface speed of the cathode in the direction of flow of the gas to be stimulated in said discharge space, is at least approximately equal to the speed of the gas flowing in the discharge space.

2. Laser according to claim 1, wherein the surface speed of the cathode is at least approximately the same as the flow speed of the gas in the discharge space (2).

3. Laser according to claim 1, wherein the surface speed of the cathode is slightly greater than the speed of the gas flowing in the discharge space.

4. Laser according to claim 1, including means (25, 26) for generating the gas flow; and wherein said rotation-symmetrical body is driven by the gas flow generated by said gas flow generating means.

5. Laser according to claim 1 including means (25, 26) for generating the gas flow;

means for applyng said gas flow to the cathode for rotating the cathode by said gas flow, and means for receiving the gas flow downstream of the cathode and passing said flowing gas through said discharge space (2) to rotate the cathode.

6. Laser according to claim 1, wherein the cathode (3) includes a shaft (6) extending at right angles to the flow direction (5) and at least approximately at right angles to the discharge in said discharge space (2).

7. Laser according to claim 6, wherein the cathode (3) comprises a cylinder having a surface which is rotation-symmetrical with respect to the shaft (6).

8. Laser according to claim 1, wherein the cathode comprises a cylinder having a shaft (6) passing through its axis;

and a turbine arrangement (9, 10) is provided, coupled to the shaft (6) of the cathode cylinder, and means for directing the gas towards said turbine arrangement and then into the discharge space (2).

9. Laser according to claim 1, wherein the cathode (3) comprises a hollow body, and a cooling fluid is passed through the hollow body defined by the cathode.

10. Laser according to claim 9, wherein the cooling fluid comprises a cooling gas;

and the cooling gas is conducted in a path rotating the cathode.

11. Laser according to claim 1, wherein the cathode comprises a concentric cylinder structure having an outer cylinder jacket (15), an inner cylinder (14) located therein and spaced from the inner wall of the outer cylinder jacket by a gap (16);

and fluid flow responsive vanes (17) extending from said outer cylinder jacket into said gap and means (17) in said gap, and coupled to the outer cylinder jacket (15) responsive to fluid flow in said gap to rotate the outer cylinder jacket, the outer surface of the cylinder jacket forming the cathode surface.

12. Laser according to claim 11, wherein the means to rotate the cylinder jacket comprises spiral or inclined vanes (17) extending, at an inclination with respect to an axial direction of the cylinder jacket (15), said vanes being subjected to gas flow from at least one of the laser-active gas being passed through the discharge space (2);

a buffer gas;

a cooling gas;

the respective gas passing axially in the gap between the cylinders and thereby rotating the cylinder jacket (15).

13. Laser according to claim 1, wherein the means (1) for defining the discharge space (2) comprises two walls, the cathode being fitted into a slit (8) in one of the walls and projecting slightly into the discharge space beyond the inner surface of the remainder of the wall.

14. Laser according to claim 1, wherein the cathode has an outer diameter of between about 3 cm to 6 cm.

15. Laser according to claim 1, wherein the cathode comprises a cylinder structure having a diameter in the order of about 5 cm.

16. Laser according to claim 13, wherein the cathode comprises a cylindrical structure having a diameter of between about 3 to 6 cm, and extending into the discharge space by about ½ cm.

17. Laser according to claim 16, wherein the cathode has a diameter in the order of about 5 cm.

18. Laser according to claim 14, wherein the cathode is a cylindrical structure and extends into the discharge space by a distance of about 10% of its diameter.

19. Laser according to claim 13, further including a flow directing structure (18) located adjacent the leading surface of the rotating cathode entering the slit (8) in the walls, and directing flow along the circumference of the cathode.

20. Laser according to claim 19, wherein the cathode is a cylindrical body of between about 3 cm to 6 cm outer diameter, and extends into the discharge space by a distance of about 10% of its diameter;

and the flow directing structure comprises a flow directing body which extends into the discharge space from the wall surface defining the discharge space by a distance which is slightly less than the distance by which the cathode extends into the discharge space.

* * * * *